United States Patent
Yamamoto et al.

(10) Patent No.: US 9,976,040 B2
(45) Date of Patent: May 22, 2018

(54) ANTIFOULING COATING COMPOSITION, ANTIFOULING COATING FILM, ANTIFOULING SUBSTRATE, AND METHOD FOR PRODUCING ANTIFOULING SUBSTRATE

(71) Applicant: CHUGOKU MARINE PAINTS, LTD., Otake-shi (JP)

(72) Inventors: Kenji Yamamoto, Otake (JP); Junnai Ikadai, Otake (JP); Hideyuki Tanaka, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 231 days.

(21) Appl. No.: 14/784,439

(22) PCT Filed: Apr. 22, 2014

(86) PCT No.: PCT/JP2014/061237
§ 371 (c)(1),
(2) Date: Oct. 14, 2015

(87) PCT Pub. No.: WO2014/175246
PCT Pub. Date: Oct. 30, 2014

(65) Prior Publication Data
US 2017/0015841 A1   Jan. 19, 2017

(30) Foreign Application Priority Data
Apr. 23, 2013   (JP) .................. 2013-090208

(51) Int. Cl.
| | |
|---|---|
| B63B 59/04 | (2006.01) |
| C09D 5/16 | (2006.01) |
| C09D 125/08 | (2006.01) |
| C09D 133/14 | (2006.01) |
| C09D 143/04 | (2006.01) |
| C09D 7/12 | (2006.01) |
| C09D 133/12 | (2006.01) |

(52) U.S. Cl.
CPC ............ C09D 5/1675 (2013.01); B63B 59/04 (2013.01); C09D 5/16 (2013.01); C09D 5/165 (2013.01); C09D 5/1618 (2013.01); C09D 5/1625 (2013.01); C09D 5/1668 (2013.01); C09D 7/12 (2013.01); C09D 125/08 (2013.01); C09D 133/12 (2013.01); C09D 133/14 (2013.01); C09D 143/04 (2013.01)

(58) Field of Classification Search
CPC ...... C09D 5/1662–5/1675; C08F 30/08; C08F 212/06; C08F 230/08; C08F 2220/343
USPC ............................. 523/122; 525/201
See application file for complete search history.

(56) References Cited

U.S. PATENT DOCUMENTS

| | | | |
|---|---|---|---|
| 6,110,990 A | 8/2000 | Nakamura et al. | |
| 6,172,132 B1 | 1/2001 | Nakamura et al. | |
| 2011/0014420 A2* | 1/2011 | Gopalan .............. | C09D 125/14 428/119 |
| 2012/0294825 A1 | 11/2012 | Ehara et al. | |
| 2015/0118405 A1 | 4/2015 | Ehara et al. | |

FOREIGN PATENT DOCUMENTS

| | | |
|---|---|---|
| CN | 102070863 A | 5/2011 |
| CN | 102575126 A | 7/2012 |
| EP | 1 907 452 A | 4/2008 |
| JP | 9-48946 A | 2/1997 |
| JP | 9-48947 A | 2/1997 |
| JP | 2001-81147 A | 3/2001 |
| JP | 2001-172548 A | 6/2001 |
| JP | 2002-97407 A | 4/2002 |
| JP | 2006-503115 A | 1/2006 |

(Continued)

OTHER PUBLICATIONS

International Search Report dated Aug. 5, 2014 in PCT/JP14/061237 Filed Apr. 22, 2014.

*Primary Examiner* — Ramsey E Zacharia
(74) *Attorney, Agent, or Firm* — Oblon, McClelland, Maier & Neustadt, L.L.P.

(57) ABSTRACT

Provided is a silyl polymer-based antifouling coating composition that is capable of forming a coating film in which cracking is inhibited from occurring for a long period from the early stage of immersion in seawater and fresh water and enables to maintain excellent coating film consumption for a long term. The antifouling coating composition includes: a copolymer (A) containing a structural unit (a-1) derived from styrene or the like, a structural unit (a-2) derived from glycidyl (meth)acrylate, and optionally a structural unit (a-3) derived from another ethylenically unsaturated monomer; a polymer (B) containing a structural unit (b-1) derived from a monomer represented by the following Formula (b1):

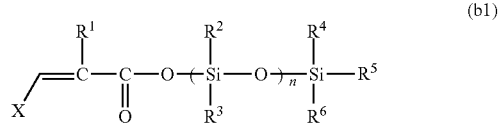

wherein X is a hydrogen atom or a carboxyl group; $R^1$ is a hydrogen atom or a methyl group; $R^2$ to $R^6$, which may be the same as or different from each other, are $C_1$-$C_6$ straight or branched chain alkyl; and n is an integer of 0 or 1 or more; and an antifoulant.

20 Claims, No Drawings

(56) References Cited

FOREIGN PATENT DOCUMENTS

| | | |
|---|---|---|
| JP | 2010-84099 A | 4/2010 |
| KR | 10-0923459 B1 | 10/2009 |
| WO | 96/38508 A1 | 12/1996 |
| WO | WO 2006/125965 A1 | 11/2006 |
| WO | 2007-116912 A1 | 10/2007 |
| WO | 2008/105122 A1 | 9/2008 |
| WO | 2011-162129 A1 | 12/2011 |

* cited by examiner

ANTIFOULING COATING COMPOSITION, ANTIFOULING COATING FILM, ANTIFOULING SUBSTRATE, AND METHOD FOR PRODUCING ANTIFOULING SUBSTRATE

BACKGROUND OF THE INVENTION

Field of the Invention

The present invention relates to an antifouling coating composition, an antifouling coating film, an antifouling substrate, and method for producing an antifouling substrate.

Description of the Related Art

In ships, offshore structures, fishing nets, and the like, antifouling coatings containing a triorganosilyl ester-containing copolymer having low toxicity and small environmental loads as compared to organotin-based antifouling coatings have been used because of adherence of various marine species on portions immersed in seawater. However, a coating film containing the triorganosilyl ester-containing copolymer has had a problem that although the coating film dissolves in seawater at a constant rate for a given period from the early stage of immersion, the hydrolysis rate of the coating film is gradually increased, and after a lapse of a long period of time, the hydrolysis rate is excessively increased, water resistance is deteriorated, and cracking and peeling occur.

As antifouling coating compositions directed at improving crack resistance, there have been proposed: an antifouling coating composition comprising a silyl polymer, a polymeric plasticizer containing an ethylenically unsaturated carboxylic acid ester copolymer having a Tg of −20° C. or less and a number average molecular weight of 500 to 20,000, and an antifoulant (Patent Literature 1); an antifouling coating composition comprising a hydrolyzable silyl polymer, a polymer incompatible with the polymer, and a low-Tg polymer (Patent Literature 2); an antifouling coating composition comprising a trialkylsilyl polymer and a (meth)acrylate-based copolymer that is compatible with the polymer and has a number average molecular weight of 1,000 to 100,000 (Patent Literature 3); an antifouling coating composition comprising a trialkylsilyl polymer, a (meth)acrylate-based copolymer that is compatible with the polymer and has a number average molecular weight of 1,000 to 100,000, and chlorinated paraffin (Patent Literature 4); and the like.

CITATION LIST

Patent Literature

Patent Literature 1: WO 2008/105122
Patent Literature 2: JP-A 2006-503115
Patent Literature 3: JP-A 9-48946
Patent Literature 4: JP-A 9-48947

However, the silyl polymer-based antifouling coating compositions disclosed in Patent Literatures 1 to 4 have been incapable of maintaining improvement of the crack resistance of a coating film and antifouling performance for a long period. Accordingly, in view of such problems in the related art, an object of the present invention is to provide a silyl polymer-based antifouling coating composition that is capable of forming a coating film in which cracking is inhibited from occurring for a long period from the early stage of immersion in seawater and fresh water and enables to maintain excellent coating film consumption for a long term.

SUMMARY OF THE INVENTION

As a result of extensive examination, the present inventors found that the above problems can be solved by blending a copolymer (A) containing a structural unit (a-1) derived from styrene and a structural unit (a-2) derived from glycidyl (meth)acrylate into an antifouling coating comprising a silyl ester-based polymer (B), and the present invention was thus accomplished. The present invention is summarized as follows.

[1]
An antifouling coating composition comprising:
a copolymer (A) containing:
10 to 80% by weight of a structural unit (a-1) derived from a monomer represented by the following Formula (a1):

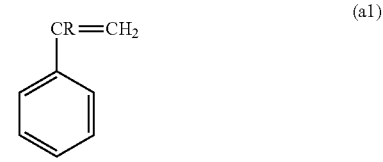

wherein R is a hydrogen atom or a methyl group,
1 to 50% by weight of a structural unit (a-2) derived from glycidyl (meth)acrylate, and
0 to 89% by weight of a structural unit (a-3) derived from another ethylenically unsaturated monomer, with the proviso that the total amount of the structural units (a-1), (a-2), and (a-3) is 100% by weight;
a polymer (B) containing a structural unit (b-1) derived from a monomer represented by the following Formula (b1):

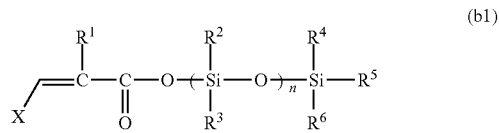

wherein X is a hydrogen atom or a carboxyl group; $R^1$ is a hydrogen atom or a methyl group; $R^2$ to $R^6$, which may be the same as or different from each other, are $C_1$-$C_6$ straight or branched chain alkyl; and n is an integer of zero (0), or 1 or more; and an antifoulant.

[2]
The antifouling coating composition according to the above [1], wherein a weight ratio between the copolymer (A) and the polymer (B) (weight of copolymer (A)/weight of polymer (B)) is 5/95 to 95/5.

[3]
The antifouling coating composition according to the above [1] or [2], wherein the polymer (B) further contains a structural unit (b-2) derived from another ethylenically unsaturated monomer; and a weight ratio between the structural unit (b-1) and the structural unit (b-2) (weight of (b-1)/weight of (b-2)) is 30/70 to 80/20.

[4]
The antifouling coating composition according to any one of the above [1] to [3], wherein the polymer (B) has a number average molecular weight of 1,000 to 30,000.

[5]
The antifouling coating composition according to any one of the above [1] to [4], wherein the monomer (compound) represented by the Formula (b1) is triisopropylsilyl (meth)acrylate.

[6]
The antifouling coating composition according to any one of the above [1] to [5], further comprising a monocarboxylic acid compound (C).

[7]
The antifouling coating composition according to the above [6], wherein a weight ratio between the total weight of the copolymer (A) and the polymer (B), and the monocarboxylic acid compound (C) ((total weight of copolymer (A) and polymer (B))/(weight of compound (C))) is 99.9/0.1 to 30/70.

[8]
The antifouling coating composition according to any one of the above [1] to [7], wherein the antifoulant is at least one selected from the group consisting of copper or copper compounds (D) (excluding copper pyrithione) and organic antifoulants (E).

[9]
The antifouling coating composition according to any one of the above [1] to [8], further comprising one or more components selected from the group consisting of a coloring agent (F), an extender pigment (G), a dehydrating agent (H), a plasticizer (I), a thixotropic agent (J), and a solvent (K).

[10]
The antifouling coating composition according to any one of the above [1] to [9], wherein the total weight of the copolymer (A) and the polymer (B) is 5% by weight or more with respect to 100% by weight of the total solid content of the antifouling coating composition.

[11]
The antifouling coating composition according to any one of the above [1] to [10], having a solid content of 70% by weight or more; and a coating viscosity (KU value) of 70 to 110 measured with a Stormer viscometer under a condition of 25° C.

[12]
An antifouling coating film formed from the antifouling coating composition according to any one of the above [1] to [11].

[13]
An antifouling substrate comprising a substrate and the antifouling coating film according to the above [12] disposed on a surface of the substrate.

[14]
The antifouling substrate according to the above [13], which is brought into contact with seawater or fresh water.

[15]
The antifouling substrate according to the above [13] or [14], wherein the substrate is at least one selected from the group consisting of underwater structures, ships, and fishing implements.

[16]
A method for producing an antifouling substrate, comprising the step of coating or impregnating a substrate with the antifouling coating composition according to anyone of the above [1] to [11].

Advantageous Effects of Invention

In the coating film formed from the antifouling coating composition according to the present invention, cracking is inhibited from occurring for a long period from the early stage of immersion in seawater and fresh water, and the coating film maintains an excellent consumption property and has an excellent long-term antifouling property.

DETAILED DESCRIPTION OF THE PREFERRED EMBODIMENTS

The antifouling coating composition according to the present invention, and the like will be described in more detail below.

[Antifouling Coating Composition]
The antifouling coating composition according to the present invention comprises the copolymer (A), the polymer (B), and the antifoulant as described above.

<Copolymer (A)>
The copolymer (A) contains a structural unit (a-1) derived from a monomer represented by the following Formula (a1):

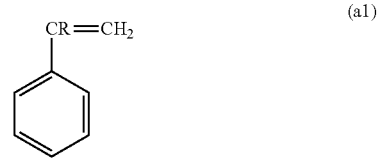

(a1)

wherein R is a hydrogen atom or a methyl group, and a structural unit (a-2) derived from glycidyl (meth)acrylate, and further optionally contains a structural unit (a-3) derived from another ethylenically unsaturated monomer (hereinafter also referred to as a "monomer (a3)").

The structural unit (a-1), the structural unit (a-2), and the structural unit (a-3) are represented by the following Formulae, respectively:

the structural unit (a-1):

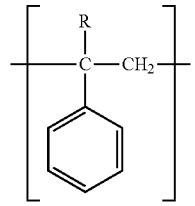

wherein R is a hydrogen atom or a methyl group;
the structural unit (a-2):

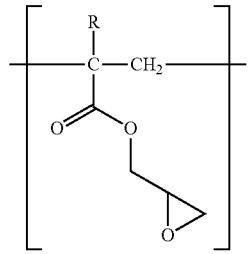

wherein R is a hydrogen atom or a methyl group; and
the structural unit (a-3):

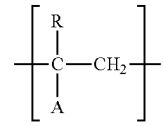

wherein R is a hydrogen atom or a methyl group, and A is a monovalent group.

Examples of the monomer (a3) include:

acrylic acid, methacrylic acid;

(meth)acrylates such as methyl (meth)acrylate (acrylate and methacrylate are collectively described as "(meth)acrylate"; and hereinafter the same applies), ethyl (meth)acrylate, propyl (meth)acrylate, isopropyl (meth)acrylate, butyl (meth)acrylate, isobutyl (meth)acrylate, tert-butyl (meth)acrylate, pentyl (meth)acrylate, hexyl (meth)acrylate, cyclohexyl (meth)acrylate, octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, 2-hydroxy-3-phenoxypropyl (meth)acrylate, 2-methoxyethyl (meth)acrylate, 2-ethoxymethyl (meth)acrylate, 4-methoxybutyl (meth)acrylate, methoxypropyl (meth)acrylate, propoxyethylethyl (meth)acrylate, 2-butoxyethyl (meth)acrylate, isobutoxyethyl (meth)acrylate, isobutoxybutyl diglycol (meth)acrylate, and phenoxyethyl (meth)acrylate;

multifunctional (meth)acrylates such as tetraethylene glycol diacrylate, tripropylene glycol diacrylate, 1,3-butanediol di(meth)acrylate, 1,4-butanediol di(meth)acrylate, 1,6-hexanediol diacrylate, ethylene glycol dimethacrylate, trimethylolpropane triacrylate, trimethylolpropane trimethacrylate, di(trimethylolpropane) tetraacrylate, pentaerythritol triacrylate, pentaerythritol tetraacrylate, and dipentaerythritol pentaacrylate; and vinyl monomers such as vinyl acetate, isobutyl vinyl ether, vinyl toluene, (meth)acrylonitrile, and vinyl propionate. Of these, methyl methacrylate, butyl acrylate, and butyl methacrylate are further preferred from the viewpoint of a long-term antifouling property.

The hardnesses, viscosities, glass transformation temperatures, and the like of the copolymer (A) and the antifouling coating film according to the present invention can be adjusted by changing the kind or amount of the structural unit (a-3).

All of the structural unit (a-3) may be derived from these monomers, while most thereof (e.g., 95% by weight or more) may be derived from these monomers, and a small amount thereof (e.g., 5% by weight or less) may be derived from another monomer.

Each of the structural unit (a-1), the structural unit (a-2), and the structural unit (a-3) may be one kind, or two or more kinds.

Since the copolymer (A) contains the structural unit (a-1) derived from styrene, the coating film or the like formed from the antifouling coating composition according to the present invention is excellent in impact resistance, flexing resistance, water resistance, and polishing performance. Since the copolymer (A) contains the structural unit (a-2) derived from glycidyl (meth)acrylate, the coating film or the like formed from the antifouling coating composition according to the present invention has excellent adhesiveness to a substrate.

An adhering action acts on the antifouling coating film against an external force such as underwater friction, and the polishing performance of the coating film is deteriorated in a case in which the antifouling coating film comprises a resin consisting of a skeleton with flexibility. On the other hand, a styrene skeleton included in the structural unit (a-1) of the copolymer (A) has a benzene ring in a side chain thereof and adequate hardness, and therefore, the antifouling coating film containing the copolymer (A) including the styrene skeleton exhibits physical polishing performance. In addition, the benzene ring included in the styrene skeleton is a hydrophobic functional group, has the effect of improving the water resistance of the antifouling coating film, and contributes to improve the physical properties of the coating film in seawater.

In general, with cold-blending a resin having a hydrolyzable group with a resin without any hydrolyzable group, the polishing performance of a hydrolyzable antifouling coating film containing the resins is deteriorated, and an antifouling property may be often caused to be deteriorated. In contrast, the copolymer (A) also has the excellent characteristic of improving the performance of the antifouling coating film containing the polymer (B) without influencing the hydrolyzability of the polymer (B).

By blending the antifouling coating composition comprising the polymer (B) with the copolymer (A), the viscosity of the coating composition can be reduced, and the high solidification of the antifouling coating composition can be realized. Furthermore, since the amount of VOC can be reduced, the antifouling coating composition according to the present invention comprising the copolymer (A) as well as the polymer (B) has high environmental safety.

The copolymer (A) can be produced with a small environmental load and at a low cost because of being a copolymer of a general-purpose monomer.

The rate of the structural unit (a-1) contained in the copolymer (A) is 10 to 80% by weight, preferably 15 to 75% by weight, still more preferably 20 to 70% by weight. The rate of excessively less than 10% by weight results in the poor impact resistance, flexing resistance, and water resistance of the coating film or the like formed from the antifouling coating composition comprising the copolymer. The rate of excessively more than 80% by weight results in easy occurrence of cracking in a drying process when the coating film is formed from the antifouling coating composition comprising the copolymer and a solvent.

The rate of the structural unit (a-2) contained in the copolymer (A) is 1 to 50% by weight, preferably 1 to 40% by weight, still more preferably 1 to 30% by weight. The rate of excessively less than 1% by weight results in the insufficient adhesiveness of the coating film formed from the antifouling coating composition of the present invention to a substrate and in the insufficient dispersibility of a pigment described below in a case in which the antifouling coating composition of the present invention comprises the pigment. The rate of excessively more than 50% by weight may result in the excessively increased affinity of the copolymer (A) for a pigment and in deterioration of antifouling performance in a case in which the antifouling coating composition comprises the pigment.

The rate of the structural unit (a-3) contained in the copolymer (A), which is a value obtained by subtracting the rates of the structural unit (a-1) and the structural unit (a-2) from a rate of all the structural units of 100% by weight, is 0 to 89% by weight, preferably 0 to 84% by weight, still more preferably 0 to 79% by weight.

The number average molecular weight of the copolymer (A) is preferably within a range of 1,000 to 50,000, more preferably 1,000 to 30,000, still more preferably 1,000 to 15,000. When the number average molecular weight is 50,000 or less, even in a case in which the antifouling coating composition according to the present invention contains a solvent, it is easy to allow the amount of a volatile organic compound (VOC) in the composition to be 400 g/L or less. When the number average molecular weight is 1,000 or more, the coating film or the like formed from the antifouling coating composition according to the present invention has excellent water resistance. The number average molecular weight can be determined with GPC under a condition adopted in after-mentioned Examples or equivalent methods.

<Polymer (B)>

The polymer (B) contains a structural unit (b-1) derived from a monomer having a triorganosilyl ester group (hereinafter also referred to as a "monomer (b1)") represented by the following Formula (b1):

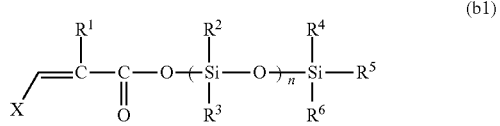

(b1)

wherein X is a hydrogen atom or a carboxyl group; $R^1$ is a hydrogen atom or a methyl group; $R^2$ to $R^6$, which may be the same as or different from each other, are $C_1$-$C_6$ straight or branched chain alkyl; and n is an integer of zero (0), or 1 or more, and further optionally contains a structural unit (b-2) derived from another ethylenically unsaturated monomer (hereinafter also referred to as a "monomer (b2)").

Examples of the monomer (b1) include:

(meth)acrylates such as tripropylsilyl (meth)acrylate, triisopropylsilyl (meth)acrylate, tributylsilyl (meth)acrylate, triisobutylsilyl (meth)acrylate, tri-sec-butylsilyl (meth)acrylate, tri-2-ethylhexylsilyl (meth)acrylate, and butyldiisopropylsilyl (meth)acrylate. Of these, alkylsilyl (meth)acrylates having a branched alkyl group are preferred from the viewpoint of hydrolysis resistance. Of the alkylsilyl (meth)acrylates, triisopropylsilyl (meth)acrylate is particularly preferable. The structural unit (b-1) may be one kind, or two or more kinds.

Examples of the monomer (b2) include:

(meth)acrylic acid;

(meth)acrylates such as methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, pentyl (meth)acrylate, hexyl (meth)acrylate, cyclohexyl (meth)acrylate, octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, 2-hydroxy-3-phenoxypropyl (meth)acrylate, 2-methoxyethyl (meth)acrylate, 2-ethoxymethyl (meth)acrylate, 4-methoxybutyl (meth)acrylate, methoxypropyl (meth)acrylate, propoxyethylethyl (meth)acrylate, 2-butoxyethyl (meth)acrylate, isobutoxyethyl (meth)acrylate, isobutoxybutyl diglycol (meth)acrylate, and phenoxyethyl (meth)acrylate; and vinyl monomers such as vinyl acetate, isobutyl vinyl ether, styrene, vinyl toluene, (meth)acrylonitrile, and vinyl propionate. The structural unit (b-2) may be one kind, or two or more kinds.

All of the structural unit (b-2) may be derived from these monomers, while most thereof (e.g., 95% by weight or more) may be derived from these monomers, and a small amount thereof (e.g., 5% by weight or less) may be derived from another monomer.

The rate of the structural unit (b-1) contained in the polymer (B) is preferably 30 to 80% by weight, more preferably 40 to 80% by weight, still more preferably 45 to 75% by weight. The rate of the structural unit (b-2) contained in the polymer (B) is preferably 20 to 70% by weight, more preferably 20 to 60% by weight, still more preferably 25 to 55% by weight. In a case in which the rate of the structural unit is in the above range, the antifouling coating film or the like formed from the antifouling coating composition according to the present invention has excellent consumption property and an excellent long-term antifouling property.

It is preferable that the number average molecular weight of the polymer (B) is preferably within a range of 1,000 to 50,000, more preferably 1,000 to 30,000, still more preferably 1,000 to 15,000. When the number average molecular weight is 50,000 or less, even in a case in which the antifouling coating composition according to the present invention contains a solvent, it is easy to allow the amount of a volatile organic compound (VOC) in the composition to be 400 g/L or less. When the number average molecular weight is 1,000 or more, the coating film or the like formed from the antifouling coating composition according to the present invention has excellent water resistance. The number average molecular weight can be determined with GPC under a condition adopted in after-mentioned Examples or equivalent methods.

<Method for Producing (Co)Polymer>

Examples of a method for producing the copolymer (A) and polymer (B) of the present invention include, but are not particularly limited to, a method comprising mixing the monomers so that the rates of the structural units are as mentioned above and polymerizing the monomers at a temperature of around 60 to 200° C. in the presence of a polymerization initiator.

As the polymerization initiator, for example, there can be used an azo radical polymerization initiator such as 2,2'-azobisisobutyronitrile, 2,2'-azobis-2-methylbutyronitrile, 2,2'-azobis-2,4-dimethylvaleronitrile, and 4,4'-azobis-4-cyano-valeric acid; a peroxide radical polymerization initiator such as tert-butylperoxy-2-ethylhexanoate, tert-butylperoxybenzoate, and di-tert-butylperoxide; or the like. Such polymerization initiators may be used singly or in combination of two or more kinds thereof.

Examples of the method for producing each of the copolymer (A) and the copolymer (B) include solution polymerization, suspension polymerization, and pressure polymerization. Solution polymerization, which is conducted under normal pressure using a common organic solvent, is preferred in view of high general-purpose properties.

Examples of the solvent used in the solution polymerization include aromatic hydrocarbon solvents such as toluene, xylene, ethylbenzene, and mesitylene; ester solvents such as butyl acetate; and ketone solvents such as methyl isobutyl ketone, and methyl amyl ketone. Of these, xylene is particularly preferred in view of high general versatility for a solvent for an antifouling coating composition. Such solvents may be used singly or in combination of two or more kinds thereof.

In consideration of the long-term storage stability of the antifouling coating composition, compatibilization between the copolymer (A) and the polymer (B) is preferably achieved. Examples of methods for confirming the compatibility between the copolymer (A) and the polymer (B) include the following method.

(Method for Confirming Compatibility)

The copolymer (A) and the polymer (B) are mixed at a weight ratio of 1:1, xylene is added to the resultant so that the total weight of solids in the copolymer (A) and the polymer (B) is 30% by weight, and they are vigorously stirred. Then, after the mixed solution has been left standing for 30 minutes, it is judged that the copolymer (A) and the polymer (B) are compatible in a case in which the mixed solution is transparent or cloudy, while the copolymer (A) and the polymer (B) are incompatible in a case in which the mixed solution is divided into two layers.

<Antifoulant>

Examples of the antifoulant include copper or copper compounds (D), and organic antifoulants (E).

(Copper or Copper Compound (D))

Examples of the copper include copper powders. Examples of the copper compounds include cuprous oxide, cuprous thiocyanate, and cupronickel. Cuprous oxide and cuprous thiocyanate are particularly preferable. In the present invention, copper pyrithione is classified into the organic antifoulants (E), not into the copper compounds (D). The amount of the copper or the copper compound (D) is preferably 0.1 to 90% by weight, more preferably 1 to 80% by weight, with respect to the total amount of solids in the antifouling coating composition according to the present invention, of 100% by weight. It is preferable that the copper compound does not contain 2% by weight or more of metallic copper as an impurity based on the total weight of the copper compound from the viewpoint of the storage stability of a coating.

The value of the amount of the solids (heating residue) is a value measured by the following method or an equivalent method. The same applies to the components other than the component (D).

[Conditions of Measurement of Content of Solids (Heating Residue)]

$X_1$ (g) of the antifouling coating composition is weighed on an aluminum test dish having a diameter of 6 cm and is spread to be homogeneous. The antifouling coating composition is heated in a constant-temperature bath at 160° C. for 1 hour to remove volatile matter. The weight ($X_2$ (g)) of resulting non-volatile matter is measured, and the content of solids (heating residue) is calculated from the following expression:

Content (%) of solids (heating residue)=$X_2/X_1 \times 100$ (Organic Antifoulant (E))

The antifouling coating composition according to the present invention may contain an organic antifoulant (E) from the viewpoint of improving slime resistance and algae resistance. The antifouling coating composition according to the present invention may contain, as another organic antifoulant (E), a metal pyrithione such as copper pyrithione and zinc pyrithione; 4,5-dichloro-2-n-octyl-4-isothiazolin-3-one, 4-bromo-2-(4-chlorophenyl)-5-(trifluoromethyl)-1H-pyrrole-3-carbonitrile, pyridine triphenylborane, N,N-dimethyldichlorophenyl urea, 2,4,6-trichlorophenylmaleimide, 2-methylthio-4-tert-butylamino-6-cyclopropyl-S-triazine, (+/−)-4-[1-(2,3-dimethylphenyl)ethyl]-1H-imidazole, 2,4,5,6-tetrachloroisophthalonitrile, bisdimethyldithiocarbamoylzinc ethylenebisdithiocarbamate, chloromethyl-n-octyldisulfide, N,N'-dimethyl-N'-phenyl-(N-fluorodichloromethylthio) sulfamide, N,N'-tolyl-N'-tolyl-(N-fluorodichloromethylthio) sulfamide, tetraalkylthiuram disulfide, zinc dimethyldithiocarbamate, zinc ethylenebisdithiocarbamate, 2,3-dichloro-N-(2',6'-diethylphenyl)maleimide, 2,3-dichloro-N-(2'-ethyl-6'-methylphenyl)maleimide, or the like. Of these, particularly preferred are metal pyrithiones such as copper pyrithione and zinc pyrithione; 4,5-dichloro-2-n-octyl-4-isothiazolin-3-one, 4-bromo-2-(4-chlorophenyl)-5-(trifluoromethyl)-1H-pyrrole-3-carbonitrile, pyridine triphenylborane, N,N-dimethyldichlorophenyl urea, 2-methylthio-4-tert-butylamino-6-cyclopropyl-S-triazine, and bisdimethyldithiocarbamoylzinc ethylenebisdithiocarbamate. The amount of the organic antifoulant (E) is preferably 0.1 to 90% by weight, more preferably 0.5 to 80% by weight, with respect to 100% by weight of the total amount of solids (heating residue) in the antifouling coating composition according to the present invention.

<Other Components>

The antifouling coating composition according to the present invention preferably contains a monocarboxylic acid compound (C) from the viewpoint of adjusting coating film consumption. Examples of the monocarboxylic acid compound (C) include aliphatic or alicyclic monocarboxylic acids, monocarboxylic acid derivatives thereof, or metal salts thereof. The weight ratio thereof (total weight of the copolymer (A) and the polymer (B)/weight of the monocarboxylic acid compound (C)) is preferably 99.9/0.1 to 30/70, still more preferably 95/5 to 40/60.

Examples of the monocarboxylic acid include rosin, rosin derivatives, naphthenic acid, cycloalkenylcarboxylic acid, bicycloalkenylcarboxylic acid, versatic acid, trimethyl isobutenyl cyclohexenecarboxylic acid, neodecanoic acid, isononanoic acid, stearic acid, hydroxystearic acid, and salicylic acid, and metal salts thereof. Of these, particularly preferred are rosin, rosin derivatives, naphthenic acid, versatic acid, and trimethyl isobutenyl cyclohexenecarboxylic acid, and metal salts thereof.

The antifouling coating composition according to the present invention may further contain anyone or more of a coloring agent (F), an extender pigment (G), a dehydrating agent (H), a plasticizer (I), a thixotropic agent (anti-sagging agent/anti-settling agent) (J), and a solvent (K).

As the coloring agent (F), various organic and inorganic pigments and dyes known in the art can be used. Examples of the organic pigments include carbon black, naphthol red, and phthalocyanine blue. Examples of the inorganic pigments includered iron oxide, baryta powder, titanium white, and yellow iron oxide. It is preferable that the antifouling coating composition according to the present invention contains the coloring agent (F) from the viewpoints of enabling arbitrary regulation of the hue of the antifouling coating film obtained from the composition. The content of such a coloring agent (F) is preferably 0.01 to 70% by weight, more preferably 0.01 to 50% by weight, with respect to the total amount of solids (heating residue) in the antifouling coating composition according to the present invention, of 100% by weight.

Examples of the extender pigments (G) include zinc oxide, talc, silica, mica, clay, and potash feldspar, and include calcium carbonate, kaoline, and alumina white, which are also used as an anti-settling agent, and white carbon, aluminum hydroxide, magnesium carbonate, barium carbonate, and barium sulfate, which are also used as a delustering agent. Of these, preferred is an extender pigment selected from the group consisting of talc, silica, mica, clay, calcium carbonate, kaoline, barium sulfate, and potash feldspar. It is preferable to use the extender pigments singly or in combination of two or more kinds from the viewpoint of enabling regulation of the film-formation property, water resistance, glossiness, and the like of an antifouling coating film obtained from the composition. The content of such an extender pigment (G) as described above is preferably 0.1 to 90% by weight, more preferably 1 to 75% by weight, with respect to 100% by weight of the total amount of solids (heating residue) in the antifouling coating composition according to the present invention.

The antifouling coating film preferably consumes at a constant rate for a long period from the early stage of immersion. When the consumption is not constant, the renewability of the coating film is suddenly increased to early lose the antifouling coating film, or the renewability of the coating film is deteriorated to increase the risk of damage thereto. Further, there is a fear that antifouling performance is varied depending on a place to be coated, and it is impossible to exhibit stable antifouling performance.

When the antifouling coating composition according to the present invention contains a pigment, the benzene ring included in the styrene skeleton of the copolymer (A) adsorbs to a hydrophobic pigment, while the structural unit (a-2) derived from glycidyl (meth)acrylate adsorbs to a hydrophilic pigment included in the coating composition through a glycidyl group. The copolymer (A) is well dispersed in the coating composition due to an effect of such an adsorption to a pigment component. The coating film formed from the antifouling coating composition comprising the copolymer (A) as well as the polymer (B) can have a homogeneous composition and can consume at a constant rate due to the effect.

Preferred examples of the dehydrating agents (H) include inorganic dehydrating agents including synthetic zeolite, anhydrous gypsum, and hemihydrate gypsum, and organic dehydrating agents including alkoxysilanes such as tetramethoxysilane, tetraethoxysilane, tetrabutoxysilane, tetraphenoxysilane, methyltriethoxysilane, dimethyldiethoxysilane, and trimethylethoxysilane, polyalkoxysilanes which are condensates of the alkoxysilane, and alkyl orthoformates such as methyl orthoformate, and ethyl orthoformate. The dehydrating agents (H) are used for preventing, e.g., gelatinization of a coating by decomposition of a hydrolyzed resin caused by moisture generated during storing the antifouling coating composition. The content of the dehydrating agent (H) is preferably 0.01 to 50% by weight, more preferably 0.01 to 30% by weight, with respect to 100% by weight of the total amount of solids (heating residue) in the antifouling coating composition according to the present invention.

Examples of the plasticizer (I) include chlorinated paraffin (also referred to as "paraffin chloride"), petroleum resins, ketone resins, TCP (tricresyl phosphate), polyvinyl ethyl ether, and dialkyl phthalate. Of these, preferred are chlorinated paraffin, petroleum resins, and ketone resins. The plasticizers may be used singly or in combination of two or more kinds thereof. It is preferable that the antifouling coating composition according to the present invention contains the plasticizer (I) from the viewpoints of further improvement of the crack resistance of a coating film (antifouling coating film) formed from the antifouling coating composition.

The chlorinated paraffin may have a straight chain or a branched chain and may be liquid or solid (powdery) at room temperature. The chlorinated paraffin of which the average number of carbon atoms in one molecule is generally 8 to 30, preferably 10 to 26, is preferably used. The chlorinated paraffin having a number average molecular weight of generally 200 to 1200, preferably 300 to 1100, a viscosity of generally 1 or more (Poise/25° C.), preferably 1.2 or more (Poise/25° C.), and a specific gravity of 1.05 to 1.80/25° C., preferably 1.10 to 1.70/25° C., is preferably used. Use of chlorinated paraffin having such an average carbon number can allow a coating film with less occurrence of breaking (cracking) and peeling to be formed using the resulting antifouling coating composition.

The chlorinated paraffin preferably has a chlorination rate (chlorine content) of 35 to 75%, still more preferably 35 to 65%. Use of chlorinated paraffin having such a chlorination rate can allow a coating film with less occurrence of breaking (cracking) and peeling to be formed using the resulting antifouling coating composition.

Examples of the chlorinated paraffin include, as commercially available products, "TOYOPARAX 150" and "TOYOPARAX A-70" manufactured by TOSOH CORPORATION.

Examples of the petroleum resins include C5-based, C9-based, styrene-based, and dicyclopentadiene-based petroleum resins, and hydrogenated products thereof, as well as "QUINTONE 1500" and "QUINTONE 1700" manufactured by ZEON CORPORATION, as commercially available products.

The content of such a plasticizer (I) as described above is preferably 0.01 to 50% by weight, more preferably 0.01 to 30% by weight, with respect to 100% by weight of the total amount of solids (heating residue) in the antifouling coating composition according to the present invention.

Examples of the thixotropic agent (anti-sagging agent/anti-settling agent) (J) include:

salts (j1) selected from the group consisting of amine salts, stearate salts, lecithin salts, and alkylsulfonate salts of Al, Ca, and Zn, based on organic clay;

organic waxes (j2) selected from the group consisting of polyethylene wax, amide wax, hydrogenated castor oil wax, and polyamide wax;

mixtures (j3) of both ((j1) and (j2)); and fine synthetic silica (j4). The thixotropic agent may be used singly or in combination of two or more kinds thereof. Such a thixotropic agent (anti-sagging agent/anti-settling agent) (J) is used for preventing precipitation of a solid material such as copper or a copper compound (D), an organic antifoulant (E), a coloring agent (F), an extender pigment (G), or a dehydrating agent (H) during storage of the antifouling coating composition, or for improving coating workability during coating. The content of the thixotropic agent (anti-sagging agent/anti-settling agent) (J) is preferably 0.01 to 50% by weight, more preferably 0.01 to 30% by weight, with respect to 100% by weight of the total amount of solids (heating residue) in the antifouling coating composition according to the present invention.

The antifouling coating composition of the present invention may contain a solvent (K) such as water or an organic solvent, if necessary, in order to improve the dispersibility of the copolymer (A) or the like in the polymer (B) or to adjust the viscosity of the composition. The solvent (K) may be a solvent used when the copolymer (A) or the polymer (B) is prepared, or may be a solvent separately added when the antifouling coating composition according to the present invention is prepared by mixing the copolymer (A) and the polymer (B) with another component, if necessary.

Examples of the organic solvent include aromatic organic solvents such as xylene, toluene, and ethylbenzene; ketones such as methyl ethyl ketone, methyl isobutyl ketone, and cyclohexanone; aliphatic ($C_1$-$C_{10}$, preferably around $C_2$-$C_5$) monohydric alcohols such as ethanol, isopropyl alcohol, butanol, and isobutanol; and ester solvents such as ethyl acetate and butyl acetate.

The content of the solvent (K) is generally 0 to 80% by weight, preferably 10 to 60% by weight, with respect to 100% by weight of the total amount of solids (heating residue) in the antifouling coating composition according to the present invention.

The total weight of the copolymer (A) and the polymer (B) is preferably 5% by weight or more, more preferably 10% by weight or more, with respect to 100% by weight of the total amount of solids (heating residue) in the antifouling coating composition according to the present invention. In a case in which the total weight is in the range, occurrence of defectiveness such as cracking in the coating film during drying the coating film formed from the antifouling coating composition comprising the solvent is inhibited.

Preferred examples of the antifouling coating composition according to the present invention include an antifouling coating composition having a solid content of 70% by weight or more and a coating viscosity (KU value) of 70 to 110, measured with a Stormer viscometer under a condition of 25° C.

<Method for Producing Antifouling Coating Composition>

The antifouling coating composition according to the present invention can be produced by appropriately utilizing a known method except that the copolymer (A) and the polymer (B) are used. The antifouling coating composition may be produced, for example, by adding the copolymer (A), the polymer (B), and, if necessary, another component (for example, a component selected from the component (C) to component (K)) at one time or in arbitrary order into a stirring vessel, mixing each component by known stirring/mixing means, and dispersing or dissolving each component in a solvent.

It is preferable to prepare the antifouling coating composition by dispersing or dissolving each component in a solvent, thereafter adding amide wax (such as, e.g., DISPARLON 630-20X), and dispersing the amide wax (e.g., dispersing the amide wax by stirring for around 10 to 20 minutes). This is because occurrence of sagging in a case in which the obtained antifouling coating composition is coated on a substrate can be reduced.

Examples of the stirring/mixing means include a high speed disperser, a sand grinding mill, a basket mill, a ball mill, a three-roll mill, a Ross mixer, a planetary mixer, and a universal Shinagawa agitator.

[Uses of Antifouling Coating Composition]

The antifouling coating film according to the present invention is formed from the antifouling coating composition according to the present invention.

The antifouling substrate according to the present invention comprises a substrate and the antifouling coating film according to the present invention disposed on a surface of the substrate.

The method for producing the antifouling substrate according to the present invention comprises the step of coating or impregnating a substrate (objective, article to be coated) with the antifouling coating composition according to the present invention, and when the composition further contains a solvent, further comprises the step of removing the solvent from the coating composition, with which the substrate is coated or impregnated. For example, coating means such as an air spray, an airless spray, a brush, or a roller can be used for the coating. For example, natural drying (i.e., leaving standing at around room temperature) or heating means such as a heater can be used for the removal of the solvent.

Examples of the substrate include, but are not particularly limited to, preferably, substrates brought into contact with seawater or fresh water, and specifically, underwater structures such as supply and exhaust ports of various (thermal and atomic) power plants, coastal roads, undersea tunnels, harbor facilities, and sludge-diffusion prevention films employed for various ocean/river civil engineering work such as canals and water channels, ships such as FRP ships (particularly a part of a ship ranging from its waterline part to its bottom), and fishing materials such as fishing gear (such as ropes and fishing nets, floats and buoys).

Examples of the materials of the substrates include steel, aluminum, and wood for ships; natural/synthetic fibers for fishing nets and the like; and synthetic resins for floats, buoys, and the like. As long as the substrates are substrates in which antifouling properties and the like are demanded in water, the materials thereof are not particularly limited.

By coating the surfaces of these substrates (in general, the surface of a primer-treated substrate where the surface of a steel substrate has been under-coated with a primer such as a anticorrosive coating if the substrate is a ship's bottom or the like) with the antifouling coating composition (antifouling paint) according to the present invention once or several times by such a method as mentioned above, or by impregnating the substrates with the antifouling coating composition (antifouling paint) according to the present invention in a case in which the substrates are fishing nets and the like, and, if necessary, curing the coated or impregnated antifouling coating composition by, e.g., removing a solvent, to form an antifouling coating film, excellent characteristics of preventing adherence of aquatic organisms such as sea lettuce, barnacle, green laver, serpula, oyster, and Bugula neritina for a long period (antifouling properties, particularly standing antifouling properties) are exhibited, and an antifouling component (e.g., copper compound (component D) or organic antifoulant (component E)) can be gradually released over a long period.

When the substrate is a ship (particularly, the bottom thereof), an underwater structure, or the like, in general, a substrate surface may be primer-treated or may be provided with a layer formed from any of an epoxy resin paint and a vinyl resin paint, an acryl resin paint, and a urethane resin paint. The antifouling coating film obtained by coating (thick coating: dried film thickness of around 100 to 600 µm) the substrate surface with the antifouling coating composition according to the present invention multiple times exhibits an excellent antifouling property as well as moderate flexibility and excellent crack resistance in good balance.

When the antifouling substrate is produced, in a case in which the substrate is a fishing net or a steel sheet having a deteriorated antifouling coating film, the substrate surface may be directly coated or impregnated (in the case of the fishing net) with the antifouling coating composition of the present invention, and in a case in which the substrate is a steel sheet material, the substrate surface may be precoated with an undercoat material such as an anti-corrosion agent or a primer to form an undercoat layer, followed by coating the surface of the undercoat layer with the coating compositions of the present invention. For the purpose of repair, the antifouling coating film of the present invention may also be further formed on a substrate surface on which the antifouling coating film of the present invention or a conventional antifouling coating film has been formed.

The thickness of the antifouling coating film according to the present invention is not particularly limited, and is, for example, around 30 to 1000 µm in a case in which the substrate is a ship or an underwater structure.

When the antifouling coating composition is applied on a substrate to form an antifouling coating film, the thickness of the antifouling coating film formed by one coating (the thickness of the coating film after removing the solvent in a case in which the antifouling coating composition contains a solvent) is not particularly limited, and is, for example, around 30 to 250 μm in a case in which the substrate is a ship or an underwater structure.

As described above, the underwater structure having the antifouling coating film of the present invention can prevent aquatic organisms from adhering thereto for a long period of time, and as a result thereof, the underwater structure can maintain its functions for a long period of time. The fishing net having the antifouling coating film of the present invention has less possibility of environmental pollution, and is prevented from clogging as a result of the prevention of the adherence of aquatic organisms.

EXAMPLES

The present invention will be specifically described in more detail below with reference to examples and comparative examples. The present invention is not limited to the examples below. In the examples and comparative examples below, "part" and "%" refer to "part by weight" and "% by weight", respectively.

For (co)polymers and (co) polymer solutions, the contents, viscosities, and GPCs of heating residues were measured.

Each measurement condition is as follows.
[Conditions of Measurement of Content of Heating Residue]
$X_1$ (g) of a (co) polymer solution was weighed on an aluminum test dish having a diameter of 6 cm and was spread to be homogeneous. The (co) polymer solution was heated in a constant-temperature bath at 160° C. for 1 hour to remove volatile matter. The weight ($X_2$ (g)) of resulting non-volatile matter was measured, and the content of a heating residue was calculated from the following expression:

Content (%) of heating residue=$X_2/X_1$×100

[Conditions of Measurement of Viscosity]
Apparatus: E-type viscometer (manufactured by Toki Sangyo Co., Ltd.)
Measurement temperature: 25° C.
[Conditions of GPC]
Apparatus: HLC-8120 GPC (manufactured by TOSOH CORPORATION)
Column: SUPER H2000+SUPER H4000 (both manufactured by TOSOH CORPORATION, 6 mm (inner diameter)× 15 cm (length))
Eluent: THF (tetrahydrofuran)
Flow rate: 0.500 ml/min
Detector: RI
Temperature of column constant-temperature bath: 40° C.
Standard substance: polystyrene Production Example 1 (Production of Solution of Copolymer (A)

In a reaction vessel provided with a stirring machine, a capacitor, a thermometer, a nitrogen introduction tube, and a dropping apparatus, 66.66 parts of xylene was put, and was heated and stirred under nitrogen atmosphere so that liquid temperature was 110° C. A mixture of monomers (50 parts of styrene, 10 parts of glycidyl methacrylate, 15 parts of methyl methacrylate, and 25 parts of butyl acrylate) and polymerization initiators (1.5 parts of 2,2'-azobis-2-methyl-butyronitrile and 1 part of tert-butylperoxybenzoate) was dropwise added from the dropping apparatus into the reaction vessel over 3 hours while maintaining the same conditions, and heating and stirring were then continued at the same temperature for 1 hour, at 120° C. for 1 hour, and at 130° C. for 1 hour, followed by adding 15.16 parts of xylene to the reaction vessel to obtain a solution of a copolymer (A)-1 (hereinafter also referred to as a "copolymer solution (A)-1").

The same operation as described above was conducted except that the monomers were changed as listed in Table 1, and the other copolymer (A) solutions (copolymer solution (A)-2 to copolymer solution (A)-13) were produced. The property values thereof are listed in Table 1.

TABLE 1

| | Copolymer (A) Solution | | | | | | | |
|---|---|---|---|---|---|---|---|---|
| | Sample name | | | | | | | |
| Monomer | Copolymer solution (A)-1 | Copolymer solution (A)-2 | Copolymer solution (A)-3 | Copolymer solution (A)-4 | Copolymer solution (A)-5 | Copolymer solution (A)-6 | Copolymer solution (A)-7 | Copolymer solution (A)-8 |
| Styrene | 50 | 50 | 50 | 50 | 50 | 25 | 15 | 80 |
| Glycidyl methacrylate | 10 | 10 | 10 | 5 | 30 | 50 | 10 | 5 |
| Methyl methacrylate | 15 | 15 | 15 | 20 | 0 | 0 | 50 | 0 |
| n-Butyl acrylate | 25 | 25 | 25 | 25 | 20 | 25 | 25 | 15 |
| Methoxyethyl acrylate | 0 | 0 | 0 | 0 | 0 | 0 | 0 | 0 |
| Number average molecular weight (Mn) | 7814 | 2181 | 13170 | 8104 | 8469 | 7835 | 8201 | 8270 |
| Content (%) of heating residue | 54.8 | 55.2 | 55.1 | 55.6 | 55.5 | 55.4 | 55.7 | 55.7 |
| Viscosity (E-type, 25° C., mPa · s) | 580 | 98 | 1918 | 766 | 1133 | 724 | 3743 | 474 |

| | Sample name | | | | |
|---|---|---|---|---|---|
| Monomer | Copolymer solution (A)-9 | Copolymer solution (A)-10 | Copolymer solution (A)-11 | Copolymer solution (A)-12 | Copolymer solution (A)-13 |
| Styrene | 50 | 80 | 0 | 85 | 0 |
| Glycidyl methacrylate | 0 | 0 | 10 | 5 | 0 |
| Methyl methacrylate | 10 | 0 | 40 | 5 | 15 |

TABLE 1-continued

| | Copolymer (A) Solution | | | | |
|---|---|---|---|---|---|
| n-Butyl acrylate | 40 | 20 | 50 | 5 | 25 |
| Methoxyethyl acrylate | 0 | 0 | 0 | 0 | 60 |
| Number average molecular weight (Mn) | 8314 | 7768 | 7733 | 8024 | 7739 |
| Content (%) of heating residue | 55.4 | 55.5 | 55.6 | 55.6 | 55.6 |
| Viscosity (E-type, 25° C., mPa · s) | 310 | 381 | 564 | 615 | 211 |

Production Example 2 (Production of Solution of Copolymer (B))

In a reaction vessel provided with a stirring machine, a capacitor, a thermometer, a nitrogen introduction tube, and a dropping apparatus, 53 parts of xylene was put, and was heated and stirred under nitrogen atmosphere so that liquid temperature was 85° C. A mixture of monomers (60 parts of triisopropylsilyl acrylate and 40 parts of methyl methacrylate) and a polymerization initiator (0.5 part of 2,2'-azobisisobutyronitrile) was dropwise added from the dropping apparatus into the reaction vessel over 4 hours while maintaining the same conditions, and heating and stirring were then continued at the same temperature for 1 hour, followed by adding 0.5 part of tert-butylperoxybenzoate to the reaction vessel. Then, heating and stirring were continued at a liquid temperature of 90° C. for 1 hour, at 100° C. for 1 hour, at 110° C. for 1 hour, and at 120° C. for 1 hour, followed by adding 28.8 parts of xylene to the reaction vessel to obtain a solution of a copolymer (B)-1 (hereinafter also referred to as a "copolymer solution (B)-1").

The same operation as described above was conducted except that the monomers were changed as listed in Table 2, and the other copolymer (B) solutions (copolymer solution (B)-2 to copolymer solution (B)-4) were produced. The property values thereof are listed in Table 2.

TABLE 2

| | Copolymer (B) Solution | | | |
|---|---|---|---|---|
| | Sample name | | | |
| Monomer | Co-polymer solution (B)-1 | Co-polymer solution (B)-2 | Co-polymer solution (B)-3 | Co-polymer solution (B)-4 |
| Triisopropylsilyl acrylate | 60 | 50 | 60 | 30 |
| Triisopropylsilyl methacrylate | 0 | 10 | 0 | 50 |
| Methyl methacrylate | 40 | 30 | 40 | 20 |
| n-Butyl acrylate | 0 | 10 | 0 | 0 |
| Number average molecular weight (Mn) | 7432 | 7328 | 392 | 7322 |
| Content (%) of heating residue | 55.1 | 55.3 | 55.3 | 55.2 |
| Viscosity (E-type, 25° C., mPa · s) | 1417 | 1028 | 492 | 914 |

Preparation of Antifouling Coating Composition

Example 1

An antifouling coating composition was prepared as described below.

First, xylene (14.1 parts), which is a solvent, and trimethyl isobutenyl cyclohexene carboxylic acid (9.0 parts) were put in a plastic container having a capacity of 1000 ml and stirred in a paint shaker until the carboxylic acid was homogeneously dissolved. The copolymer solution (A)-1 (8.2 parts) and the copolymer solution (B)-1 (8.2 parts) were added to the resulting solution, they were stirred until being homogeneously mixed, zinc oxide (4.0 parts), cuprous oxide NC301 (44 parts), naphthol red (2.5 parts), titanium white R-5N (1.5 parts), copper pyrithione (3.0 parts), an anti-settling agent DISPARLON 4200-20X (2.0 parts), and calcined plaster FT-2 (1.0 part) were then further added, 200 parts of glass beads were added, and they were dispersed by stirring them for 1 hour. An anti-sagging agent DISPARLON 630-20X (2.5 parts) was added to the resulting dispersion, and they were dispersed by stirring them for 20 minutes and were thereafter filtrated through an 80-mesh filter screen to prepare an antifouling coating composition.

Examples 2 to 18

An antifouling coating composition was prepared in the same manner as in Example 1 except that the blending amount was changed as listed in Table 3.

TABLE 3

| | Table of Blends in Examples | | | | | | | | | | | | | | | | | |
|---|---|---|---|---|---|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
| Copolymer solution (B)-1 | 8.2 | 8.2 | 8.2 | 8.2 | 8.2 | 8.2 | 8.2 | 8.2 | 14.0 | 12.3 | 4.1 | | | | 8.2 | 3.0 | 3.0 | 3.0 |
| Copolymer solution (B)-2 | | | | | | | | | | | | 8.2 | | | | | | |

TABLE 3-continued

Table of Blends in Examples

| | Ex. 1 | Ex. 2 | Ex. 3 | Ex. 4 | Ex. 5 | Ex. 6 | Ex. 7 | Ex. 8 | Ex. 9 | 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|
| Copolymer solution (B)-3 | | | | | | | | | | | | | 8.2 | | | | | |
| Copolymer solution (B)-4 | | | | | | | | | | | | | | 8.2 | | | | |
| Copolymer solution (A)-1 | 8.2 | | | | | | | | 2.4 | 4.1 | 12.3 | 8.2 | 8.2 | 8.2 | 8.2 | 22.0 | 22.0 | 22.0 |
| Copolymer solution (A)-2 | | 8.2 | | | | | | | | | | | | | | | | |
| Copolymer solution (A)-3 | | | 8.2 | | | | | | | | | | | | | | | |
| Copolymer solution (A)-4 | | | | 8.2 | | | | | | | | | | | | | | |
| Copolymer solution (A)-5 | | | | | 8.2 | | | | | | | | | | | | | |
| Copolymer solution (A)-6 | | | | | | 8.2 | | | | | | | | | | | | |
| Copolymer solution (A)-7 | | | | | | | 8.2 | | | | | | | | | | | |
| Copolymer solution (A)-8 | | | | | | | | 8.2 | | | | | | | | | | |
| WW Rosin | | | | | | | | | | | | | | | 4.5 | | | |
| Trimethyl isobutenyl cyclohexene carboxylic acid (50%) | 9.0 | 9.0 | 9.0 | 9.0 | 9.0 | 9.0 | 9.0 | 9.0 | 9.0 | 9.0 | 9.0 | 9.0 | 9.0 | 9.0 | | | | |
| Versatic acid | | | | | | | | | | | | | | | | 4.0 | 4.0 | 4.0 |
| Cuprous oxide NC301 | 44 | 44 | 44 | 44 | 44 | 44 | 44 | 44 | 44 | 44 | 44 | 44 | 44 | 44 | 44 | 44 | 44 | 44 |
| Zinc oxide | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Calcined plaster FT-2 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Talc | | — | | | | | | | | | | | | | | 5.0 | 5.0 | 6.0 |
| Titanium white R-5N | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.0 | 1.0 | 1.0 |
| Organic red pigment (naphthol red) | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 1.0 | 1.0 | 1.0 |
| Iron oxide red (red oxide) | | | | | | | | | | | | | | | | 0.5 | 0.5 | 0.5 |
| Copper pyrithione | 3 | 3 | 3 | 3 | 3 | 3 | 3 | 3 | 3 | 3 | 3 | 3 | 3 | 3 | 1 | | | |
| 4,5-Dichloro-2-n-octyl-4-isothiazolin-3-one | | | | | | | | | | | | | | | | | 3 | |
| DISPARLON 4200-20X (20%) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| DISPARLON 630-20X (20%) | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Xylene | 14.1 | 14.1 | 14.1 | 14.1 | 14.1 | 14.1 | 14.1 | 14.1 | 14.1 | 14.1 | 14.1 | 14.1 | 14.1 | 14.1 | 18.6 | 9.0 | 7.0 | 9.0 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Solid content (%) of paint | 70.4 | 70.4 | 70.4 | 70.4 | 70.4 | 70.4 | 70.4 | 70.4 | 70.4 | 70.4 | 70.4 | 70.4 | 70.4 | 70.4 | 70.4 | 78.1 | 78 | 78.1 |

Comparative Examples 1 to 6

An antifouling coating composition was prepared in the same manner as in Example 1 except that the blending amount was changed as listed in Table 4.

TABLE 4

Table of Blends in Comparative Examples

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Copolymer solution (B)-1 | 8.2 | 8.2 | 8.2 | 8.2 | 8.2 | 16.4 |
| Copolymer solution (A)-9 | 8.2 | | | | | |
| Copolymer solution (A)-10 | | 8.2 | | | | |
| Copolymer solution (A)-11 | | | 8.2 | | | |
| Copolymer solution (A)-12 | | | | 8.2 | | |
| Copolymer solution (A)-13 | | | | | 8.2 | |

TABLE 4-continued

Table of Blends in Comparative Examples

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| WW Rosin |  |  |  |  |  | 4.5 |
| Trimethyl isobutenyl cyclohexene carboxylic acid (50%) | 9.0 | 9.0 | 9.0 | 9.0 | 9.0 |  |
| Versatic acid |  |  |  |  |  |  |
| Cuprous oxide NC301 | 44 | 44 | 44 | 44 | 44 | 44 |
| Zinc oxide | 4.0 | 4.0 | 4.0 | 4.0 | 4.0 | 4.0 |
| Calcined plaster FT-2 | 1.0 | 1.0 | 1.0 | 1.0 | 1.0 | 1.0 |
| Talc |  |  |  |  |  |  |
| Titanium white R-5N | 1.5 | 1.5 | 1.5 | 1.5 | 1.5 | 1.5 |
| Organic red pigment (naphthol red) | 2.5 | 2.5 | 2.5 | 2.5 | 2.5 | 2.5 |
| Iron oxide red (red oxide) |  |  |  |  |  |  |
| Copper pyrithione | 3 | 3 | 3 | 3 | 3 | 3 |
| 4,5-Dichloro-2-n-octyl-4-isothiazolin-3-one |  |  |  |  |  |  |
| DISPARLON 4200-20X (20%) | 2.0 | 2.0 | 2.0 | 2.0 | 2.0 | 2.0 |
| DISPARLON 630-20X (20%) | 2.5 | 2.5 | 2.5 | 2.5 | 2.5 | 2.5 |
| Xylene | 14.1 | 14.1 | 14.1 | 14.1 | 14.1 | 18.6 |
| Total | 100.0 | 100.0 | 100.0 | 100.0 | 100.0 | 100.0 |
| Solid content (%) of paint | 70.4 | 70.4 | 70.4 | 70.4 | 70.4 | 70.4 |

The details of the components used in Examples and Comparative Examples are as follows.

TABLE 5

| Component | Manufacturer | Non-volatile matter (% by weight) |
|---|---|---|
| WW Rosin | China | 100 |
| Versatic acid | Resolution Netherlands | 100 |
| Cuprous oxide NC301 | NISSIN CHEMCO Co., Ltd. | 100 |
| Zinc oxide | HakusuiTech Co., Ltd. | 100 |
| Calcined plaster FT-2 | NORITAKE CO., LIMITED | 100 |
| Talc | Fukuoka Talc Co., Ltd. | 100 |
| Titanium white R-5N | Sakai Chemical Industry Co., Ltd. | 100 |
| Organic red pigment (naphthol red) | Clariant | 100 |
| Iron oxide red (red oxide) | MORISHITA BENGARA KOGYO CO., LTD. | 100 |
| Copper pyrithione | Arch Chemicals | 100 |
| 4,5-Dichloro-2-n-octyl-4-isothiazolin-3-one | Rohm and Haas | 30 |
| DISPARLON 4200-20X | Kusumoto Chemicals, Ltd. | 20 |
| DISPARLON 630-20X | Kusumoto Chemicals, Ltd. | 20 |
| Xylene | Mitsui Chemicals, Inc. | 0 |

<Evaluation of Physical Properties of Antifouling Coating Composition>

The physical properties of the antifouling coating compositions of Examples 1 to 18 and Comparative Examples 1 to 6, and the coating films formed therefrom were evaluated as described below. The obtained results are listed in Table 6.

(1) Measurement of Viscosity of Coating

Measurement was conducted with a Stormer viscometer in accordance with JIS K-5600-2-2.

Stormer viscometer: STORMER VISCOMETER manufactured by Coating Tester Co., Ltd.

Set temperature: 25° C. 0.5° C.

Sample amount: 500 ml

Weight: 75 g to 1000 g (2) Accelerated Deterioration Test of Antifouling Coating Film A sandblast treatment steel sheet of 150×70×1.6 mm was coated with an epoxy paint ("BANNOH 500" manufactured by CHUGOKU MARINE PAINTS, LTD.) so that the thickness of a dried film was 150 μm and with an epoxy binder paint ("BANNOH 500N" manufactured by CHUGOKU MARINE PAINTS, LTD.) so that the thickness of a dried film was 100 μm, in this order at intervals of a day, followed by coating the surface of the coating film formed from the epoxy binder paint with the antifouling coating composition prepared in each of Examples and Comparative Examples so that the thickness of the dried film thereof was 150 μm, to make a test plate. Two test plates were made for one antifouling coating composition.

The test plates were dried at 23° C. for 7 days, one test plate was immersed in natural seawater at 50° C. while the other test plate was immersed in city water at 50° C., the appearance of the coating film was investigated for each plate on a monthly basis for 4 months. The natural seawater and the city water were replaced every week with fresh natural seawater and fresh city water, respectively.

A crack in the coating film was evaluated using the test plate immersed in seawater at 50° C. according to JIS K5600-8-4, while a blister was evaluated by visual observation using the test plate immersed in city water at 50° C.

Evaluation Criteria:

<Cracking Property>

0: It is impossible to visually observe any crack even under 10 times magnification.

1: It is possible to visually observe a crack under 10 times magnification.

2: It is possible to only just recognize a crack with normally corrected vision.

3: It is possible to clearly recognize a crack with normally corrected vision.

4: A large crack that generally reaches a width of 1 mm.

5: A very large crack that generally has a width of more than 1 mm.

<Blister Property>

0: No abnormal appearance.

1: There are one to five blisters.

2: There are five or more blisters.

(3) Test of Standing Antifouling Property

A sandblast treatment steel sheet of 100×300×3.2 mm was coated with an epoxy paint ("BANNOH 500" manufactured by CHUGOKU MARINE PAINTS, LTD.) so that the thickness of a dried film was 150 μm and with an epoxy binder paint ("BANNOH 500N" manufactured by CHUGOKU MARINE PAINTS, LTD.) so that the thickness of a dried film was 100 μm, in this order at intervals of a day, followed by coating the surface of the coating film formed from the epoxy binder paint with the antifouling coating composition prepared in each of Examples and Comparative Examples so that the thickness of the dried film thereof was 150 μm, at coating intervals of one day, to make a test plate.

The test plate was dried at 23° C. for 7 days, and was left standing and immersed in the Nagasaki Gulf in Nagasaki, the adherence area of deposited organisms was measured by visual observation on a monthly basis, and evaluation was conducted based on the following evaluation criteria.

<Evaluation Criteria>

0: There is no adherence of any aquatic organism.

0.5: The adherence area of aquatic organisms is more than 0% and 10% or less.

1: The adherence area of aquatic organisms is more than 10% and 20% or less.

2: The adherence area of aquatic organisms is more than 20% and 30% or less.

3: The adherence area of aquatic organisms is more than 30% and 40% or less.

4: The adherence area of aquatic organisms is more than 40% and 50% or less.

5: The adherence area of aquatic organisms is more than 50%.

(4) Coating Film Consumption

Each antifouling coating composition obtained in Examples and Comparative Examples was applied on a hard vinyl chloride plate (50 mm×50 mm×1.5 mm) by an applicator and dried so that the thickness of a dried film was 150 μm, to make a test plate.

The obtained test plate was mounted on a rotating drum, the rotating drum was immersed in seawater and rotated at a peripheral speed of 15 knots under the condition of a seawater temperature of 30° C., and the thickness of film consumption was measured on a monthly basis. Further, the appearance of the coating film was observed 12 months after the start of the immersion and was evaluated based on the following evaluation criteria.

Evaluation criteria: Appearance

AA: There is no abnormal appearance.

CC: Cracking occurs.

TABLE 6

| | | | | List of Various Performance Evaluations | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| (1) Coating viscosity KU/25° C. | 82 | 74 | 88 | 83 | 79 | 81 | 82 | 82 |
| (2) Crack resistance after accelerated degradation immersion | | | | | | | | |
| 1 month | 0 | 0 | 0 | 0 | 0 | 0 | 0 | 0 |
| 2 months | 0 | 0 | 0 | 0 | 0 | 0 | 0 | 0 |
| 3 months | 0 | 0 | 0 | 0 | 0 | 0 | 0 | 0 |
| 4 months | 0 | 1 | 0 | 0 | 0 | 1 | 0 | 0 |
| Blister resistance after accelerated degradation immersion | | | | | | | | |
| 1 month | 0 | 0 | 0 | 0 | 0 | 0 | 0 | 0 |
| 2 months | 0 | 0 | 0 | 0 | 0 | 0 | 0 | 0 |
| 3 months | 0 | 0 | 0 | 1 | 0 | 0 | 1 | 0 |
| 4 months | 0 | 1 | 0 | 1 | 0 | 0 | 1 | 0 |
| (3) Standing antifouling property | | | | | | | | |
| 1 month | 0 | 0 | 0 | 0 | 0 | 0 | 0 | 0 |
| 3 months | 0 | 0 | 0 | 0 | 0 | 0 | 0 | 0 |
| 6 months | 0 | 0 | 0 | 0 | 0 | 0.5 | 0 | 0.5 |
| 9 months | 0 | 0 | 0 | 0 | 0 | 1 | 0.5 | 1 |
| 12 months | 0 | 0.5 | 0 | 0 | 0.5 | 2 | 1 | 1 |
| (4) Coating film consumption (μm) | | | | | | | | |
| 1 month | 12 | 5 | 12 | 13 | 9 | 11 | 9 | 11 |
| 2 months | 17 | 9 | 22 | 15 | 14 | 15 | 14 | 12 |
| 3 months | 22 | 15 | 33 | 25 | 20 | 19 | 20 | 18 |
| 4 months | 28 | 21 | 44 | 31 | 27 | 25 | 27 | 25 |
| 5 months | 35 | 27 | 54 | 38 | 32 | 31 | 32 | 33 |
| 6 months | 44 | 32 | 62 | 44 | 39 | 37 | 39 | 42 |
| 7 months | 52 | 37 | 71 | 51 | 44 | 42 | 44 | 49 |
| 8 months | 59 | 41 | 80 | 58 | 52 | 49 | 52 | 55 |
| 9 months | 64 | 46 | 90 | 64 | 58 | 56 | 58 | 61 |
| 10 months | 71 | 50 | 100 | 69 | 64 | 63 | 64 | 69 |
| 11 months | 79 | 56 | 111 | 73 | 69 | 69 | 69 | 75 |
| 12 months | 83 | 61 | 120 | 80 | 74 | 76 | 74 | 79 |
| Coating film appearance | AA | AA | AA | AA | AA | AA | AA | AA |

TABLE 6-continued

List of Various Performance Evaluations

| | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| (1) Coating viscosity KU/25° C. | 81 | 82 | 81 | 82 | 79 | 80 | 82 | 98 | 98 | 100 |
| (2) Crack resistance after accelerated degradation immersion | | | | | | | | | | |
| 1 month | 0 | 0 | 0 | 0 | 0 | 0 | 0 | 0 | 0 | 0 |
| 2 months | 0 | 0 | 0 | 0 | 0 | 0 | 0 | 0 | 0 | 0 |
| 3 months | 0 | 0 | 0 | 0 | 0 | 0 | 0 | 0 | 0 | 0 |
| 4 months | 1 | 1 | 0 | 0 | 0 | 0 | 0 | 0 | 0 | 0 |
| Blister resistance after accelerated degradation immersion | | | | | | | | | | |
| 1 month | 0 | 0 | 0 | 0 | 0 | 0 | 0 | 0 | 0 | 0 |
| 2 months | 0 | 0 | 0 | 0 | 0 | 0 | 0 | 0 | 0 | 0 |
| 3 months | 0 | 0 | 0 | 0 | 0 | 0 | 0 | 0 | 0 | 0 |
| 4 months | 0 | 0 | 0 | 0 | 1 | 0 | 0 | 0 | 0 | 0 |
| (3) Standing antifouling property | | | | | | | | | | |
| 1 month | 0 | 0 | 0 | 0 | 0 | 0 | 0 | 0 | 0 | 0 |
| 3 months | 0 | 0 | 0 | 0 | 0 | 0 | 0 | 0 | 0 | 0 |
| 6 months | 0 | 0 | 0 | 0 | 0 | 0 | 0 | 0 | 0 | 0 |
| 9 months | 0 | 0 | 0.5 | 0.5 | 0 | 0.5 | 0 | 0 | 0 | 0.5 |
| 12 months | 0 | 0 | 1 | 1 | 0 | 1 | 0 | 0.5 | 0.5 | 1 |
| (4) Coating film consumption (μm) | | | | | | | | | | |
| 1 month | 13 | 13 | 4 | 11 | 13 | 4 | 13 | 4 | 4 | 5 |
| 2 months | 23 | 26 | 9 | 22 | 27 | 9 | 26 | 8 | 10 | 9 |
| 3 months | 36 | 35 | 13 | 32 | 38 | 13 | 35 | 11 | 16 | 12 |
| 4 months | 48 | 47 | 17 | 44 | 49 | 17 | 47 | 15 | 20 | 17 |
| 5 months | 55 | 53 | 22 | 53 | 58 | 22 | 53 | 20 | 26 | 22 |
| 6 months | 68 | 63 | 26 | 63 | 68 | 26 | 63 | 24 | 29 | 25 |
| 7 months | 76 | 74 | 31 | 74 | 79 | 31 | 74 | 29 | 32 | 29 |
| 8 months | 82 | 82 | 35 | 84 | 91 | 35 | 82 | 33 | 38 | 34 |
| 9 months | 93 | 91 | 39 | 94 | 102 | 39 | 91 | 38 | 41 | 39 |
| 10 months | 101 | 102 | 43 | 102 | 111 | 43 | 102 | 42 | 45 | 42 |
| 11 months | 114 | 112 | 49 | 112 | 121 | 49 | 112 | 47 | 50 | 47 |
| 12 months | 120 | 119 | 52 | 119 | 131 | 52 | 119 | 50 | 53 | 51 |
| Coating film appearance | AA | AA | AA | AA | AA | AA | AA | AA | AA | AA |

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| (1) Coating viscosity KU/25° C. | 84 | 86 | 84 | 85 | 85 | 87 |
| (2) Crack resistance after accelerated degradation immersion | | | | | | |
| 1 month | 0 | 0 | 1 | 0 | 1 | 1 |
| 2 months | 1 | 1 | 2 | 0 | 1 | 2 |
| 3 months | 1 | 1 | 2 | 0 | 2 | 4 |
| 4 months | 2 | 2 | 3 | 0 | 3 | 5 |
| Blister resistance after accelerated degradation immersion | | | | | | |
| 1 month | 0 | 1 | 1 | 0 | 1 | 1 |
| 2 months | 1 | 2 | 2 | 0 | 1 | 2 |
| 3 months | 2 | 2 | 2 | 0 | 2 | 2 |
| 4 months | 2 | 2 | 2 | 0 | 2 | 2 |
| (3) Standing antifouling property | | | | | | |
| 1 month | 0 | 0 | 0 | 0 | 0 | 0 |
| 3 months | 1 | 0 | 1 | 0.5 | 0.5 | 0 |
| 6 months | 1 | 1 | 1 | 1 | 1 | 0 |
| 9 months | 2 | 2 | 1 | 2 | 2 | 0 |
| 12 months | 3 | 4 | 3 | 2 | 3 | 1 |
| (4) Coating film consumption (μm) | | | | | | |
| 1 month | 10 | 10 | 11 | 9 | 9 | 12 |
| 2 months | 18 | 18 | 19 | 18 | 30 | 37 |
| 3 months | 23 | 23 | 25 | 24 | 55 | 59 |

TABLE 6-continued

| List of Various Performance Evaluations | | | | | | |
|---|---|---|---|---|---|---|
| 4 months | 27 | 26 | 29 | 28 | 77 | 80 |
| 5 months | 30 | 29 | 32 | 31 | 91 | 97 |
| 6 months | 32 | 32 | 34 | 32 | 102 | 107 |
| 7 months | 34 | 33 | 36 | 33 | 109 | 113 |
| 8 months | 36 | 34 | 38 | 34 | 111 | 116 |
| 9 months | 38 | 36 | 39 | 35 | 112 | 119 |
| 10 months | 40 | 38 | 39 | 35 | 113 | 120 |
| 11 months | 41 | 39 | 40 | 36 | 114 | 121 |
| 12 months | 41 | 40 | 41 | 37 | 114 | 121 |
| Coating film appearance | CC | CC | CC | AA | CC | CC |

The invention claimed is:

1. An antifouling coating composition, comprising:
a copolymer (A) containing:
10 to 80% by weight of a structural unit (a-1) derived from a monomer represented by the following Formula (a1):

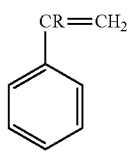

$$CR=CH_2$$ (a1)

wherein R is a hydrogen atom or a methyl group,
1 to 50% by weight of a structural unit (a-2) derived from glycidyl (meth)acrylate, and
0 to 89% by weight of a structural unit (a-3) derived from another ethylenically unsaturated monomer,
with the proviso that a total amount of the structural units (a-1), (a-2), and (a-3) is 100% by weight;
a polymer (B) containing a structural unit (b-1) derived from a monomer represented by the following Formula (b1):

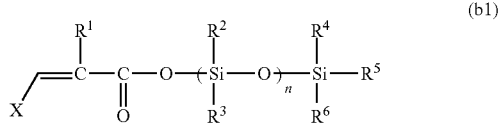

(b1)

wherein
X is a hydrogen atom or a carboxyl group,
$R^1$ is a hydrogen atom or a methyl group,
$R^2$ to $R^6$, which may be the same as or different from each other, are $C_1$-$C_6$ straight or branched chain alkyl, and
n is an integer of 0 or 1 or more; and
an antifoulant.

2. The antifouling coating composition according to claim 1, wherein a weight ratio between the copolymer (A) and the polymer (B) (weight of copolymer (A)/weight of polymer (B)) is 5/95 to 95/5.

3. The antifouling coating composition according to claim 1, wherein:
the polymer (B) further comprises a structural (b-2) derived from another ethylenically unsaturated monomer; and
a weight ratio between the structural unit (b-1) and the structural unit (b-2) (weight of (b-1)/weight of (b-2)) is 30/70 to 80/20.

4. The antifouling coating composition according to claim 1, wherein the polymer (B) has a number average molecular weight of 1,000 to 30,000.

5. The antifouling coating composition according to claim 1, wherein the monomer represented by the Formula (b1) is triisopropylsilyl (meth)acrylate.

6. The antifouling coating composition according to claim 1, further comprising a monocarboxylic acid compound (C).

7. The antifouling coating composition according to claim 6, wherein a weight ratio between a total weight of the copolymer (A) and the polymer (B), and the monocarboxylic acid compound (C) ((total weight of copolymer (A) and polymer (B))/(weight of compound (C))) is 99.9/0.1 to 30/70.

8. The antifouling coating composition according to claim 1, wherein the antifoulant is at least one selected from the group consisting of copper, a copper compound (D) and an organic antifoulant (E),
with the proviso that the antifoulant is not copper pyrithione.

9. The antifouling coating composition according to claim 1, further comprising one or more components selected from the group consisting of a coloring agent (F), an extender pigment (G), a dehydrating agent (H) a plasticizer (I), a thixotropic agent (J), and a solvent (K).

10. The antifouling coating composition according to claim 1, wherein a total weight of the copolymer (A) and the polymer (B) is 5% by weight or more with respect to 100% by weight of a total solid content of the antifouling coating composition.

11. The antifouling coating composition according to claim 1, having a solid content of 70% by weight or more, and a coating viscosity (KU value) of 70 to 110 measured with a Stormer viscometer under a condition of 25° C.

12. An antifouling coating film formed from the antifouling coating composition according to claim 1.

13. An antifouling substrate, comprising a substrate and the antifouling coating film of claim 12 disposed on a surface of the substrate.

14. The antifouling substrate according to claim 13, which is in contact with seawater or fresh water.

15. The antifouling substrate according to claim 13, wherein the substrate is at least one selected from the group consisting of an underwater structure, a ship and a fishing implement.

16. A method for producing an antifouling substrate, the method comprising coating or impregnating a substrate with the antifouling coating composition of claim 1.

17. The antifouling coating composition according to claim 1, wherein:
polymer (A) has a number average molecular weight of 1,000 to 50,000;

polymer (B) further comprises a structural unit (b-2) derived from another ethylenically unsaturated monomer;
a weight ratio between the structural unit (b-1) and the structural unit (b-2) (weight of (b-1)/weight of (b-2)) is 30/70 to 80/20;
X is a hydrogen atom;
polymer (B) has a number average molecular weight of 1,000 to 30,000;
a weight ratio between copolymer (A) and polymer (B) (weight of copolymer (A)/weight of polymer (B)) is 5/95 to 95/5; and
a total weight of the copolymer (A) and the polymer (B) is 5% by weight or more with respect to 100% by weight of a total solid content of the antifouling coating composition.

18. The antifouling coating composition according to claim 1, wherein:
polymer (A) has a number average molecular weight of 1,000 to 50,000;
polymer (B) further comprises a structural unit (b-2) derived from another ethylenically unsaturated monomer;
a weight ratio between the structural unit (b-1) and the structural unit (b-2) (weight of (b-1)/weight of (b-2)) is 30/70 to 80/20;
X is a hydrogen atom;
n is 1;
polymer (B) has a number average molecular weight of 1,000 to 30,000;
a weight ratio between copolymer (A) and polymer (B) (weight of copolymer (A)/weight of polymer (B)) is 5/95 to 95/5; and
a total weight of the copolymer (A) and the polymer (B) is 5% by weight or more with respect to 100% by weight of a total solid content of the antifouling coating composition.

19. The antifouling coating composition according to claim 1, wherein:
polymer (A) has a number average molecular weight of 1,000 to 50,000;
polymer (B) further comprises a structural unit (b-2) derived from another ethylenically unsaturated monomer;
a weight radio between the structural unit (b-1) and the structural unit (b-2) (weight of (b-1)/weight of (b-2)) is 30/70 to 80/20;
X is a hydrogen atom;
n=1 or more;
polymer (B) has a number average molecular weight of 1,000 to 30,000;
a weight ratio between copolymer (A) and polymer (B) (weight of copolymer (A)/weight of polymer (B)) is 5/95 to 95/5; and
a total weight of the copolymer (A) and the polymer (B) is 5% by weight or more with respect to 100% by weight of a total solid content of the antifouling coating composition.

20. The antifouling coating composition according to claim 1, wherein:
polymer (A) has a number average molecular weight of 1,000 to 50,000;
polymer (B) further comprises a structural unit (b-2) derived from another ethylenically unsaturated monomer;
a weight ratio between the structural (b-1) and the structural unit (b-2) (weight of (b-1)/weight of (b-2)) is 30/70 to 80/20;
X is a hydrogen atom;
n is 0;
polymer (B) has a number average molecular weight of 1,000 to 30,000;
a weight ratio between copolymer (A) and polymer (B) (weight of copolymer (A)/weight of polymer (B)) is 5/95 to 95/5; and
a total weight of the copolymer (A) and the polymer (B) is 5% by weight or more with respect to 100% by weight of a total solid content of the antifouling coating composition.

* * * * *